May 29, 1951 — L. K. ARNOLD — 2,554,769
DRYING EQUIPMENT
Filed Sept. 16, 1948
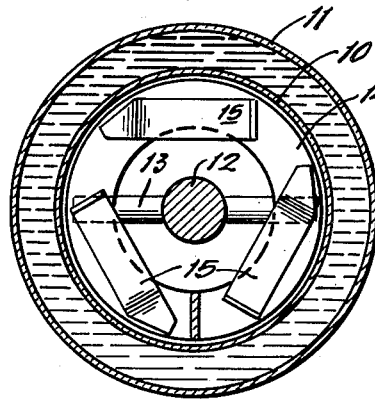
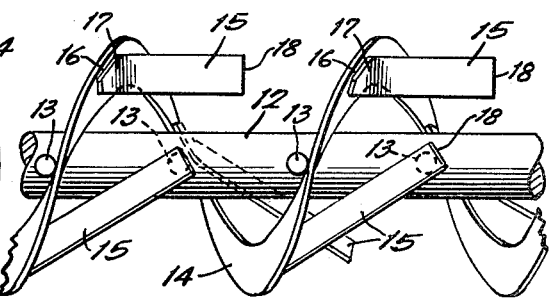
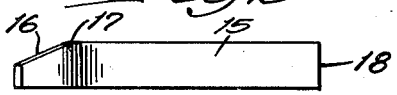
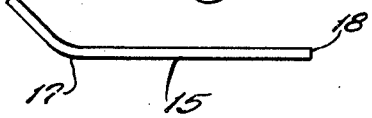
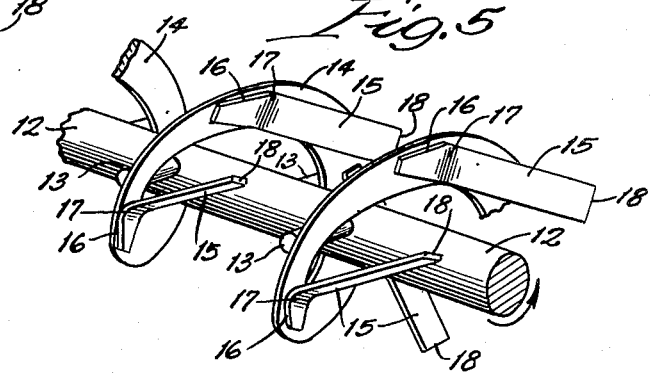
Inventor:
Lionel K. Arnold,
By Dawson, Ornes, Booth and Spangenberg,
Attorneys.

Patented May 29, 1951

2,554,769

UNITED STATES PATENT OFFICE 2,554,769

DRYING EQUIPMENT

Lionel K. Arnold, Ames, Iowa, assignor to Iowa State College Research Foundation, Ames, Iowa, a corporation of Iowa Application September 16, 1948, Serial No. 49,561

2 Claims. (Cl. 259—109)

This invention relates to drying equipment and is particularly useful in the drying or removal by heat of volatile liquids from admixtures with solids.

It is often desirable to carry out the removal by heat of certain volatile liquids from admixtures with solids in apparatus conveniently arranged for recovering the evaporated material in vapor form for subsequent adsorption or condensation. Apparatus which is continuous in operation is frequently preferred to that in which only batch operations may be carried out. For this purpose it is not uncommon to use steam jacketed, or otherwise heated, tubes through which the material to be "dried" is conveyed by paddles or spiral screws. To secure rapid and complete vapor removal from the solids, agitation and mixing is desirable. Paddles and other devices used to produce the agitation frequently cause excessive breakage of the solids resulting in large amounts of dust which is carried out with vapor to the condensers. Ribbon type screw conveyors are not only effective in moving the material through the tubes but allow the vapor to flow freely through the open space around the shaft to the discharge end. While they produce less dust than some other means they have the disadvantage of moving the solid material with very little mixing and are thus relatively inefficient in removing the vaporized material from the solid mass.

An object of the present invention is to provide a conveyor structure equipped with means for exposing freshly heated surfaces of the moving solid mass to open air spaces to permit the liquid to flash into vapor while at the same time avoiding the breakage of the solids or the production of dust and while advancing the solids through the drying chamber. Yet another object is to equip a spiral screw conveyor with mixing bars or flights so as to carry the solids up the sides of the hot tube beyond the position normally reached by the screw action alone. Yet another object is to provide in such a structure mixing bars or flights having portions which are forwardly and downwardly inclined as the bars or flights are being raised so as to carry forward lumps, etc. which have been built up in the drier. Yet another object is to provide a ribbon type screw conveyor having mixing flights secured to the front surfaces thereof at spaced intervals for the effective movement of the heated solids to permit the escape of vapors therefrom without excessive breakage of the material and while advancing the lumps that have been formed. Other specific objects and advantages will appear as the specification proceeds.

The invention is illustrated, in a single embodiment, by the accompanying drawing, in which:

Fig. 1 is a transverse sectional view of apparatus embodying my invention; Fig. 2, a broken side view in elevation of a spiral screw conveyor equipped with flights embodying my invention; Fig. 3, a top plan view of a flight which may be employed in the practice of my invention; Fig. 4, a side view in elevation of the flight shown in Fig. 3; and Fig. 5, a perspective view of the flight-equipped spiral conveyor shown in Fig. 2.

It will be understood that any suitable type of drying chamber may be employed. The drying operation may be carried out in any drying or mixing compartment, casing, or trough in which a spiral screw will effectively operate. For example, a U-shaped conveyor trough may be employed. The heat may be applied by a heating medium in a jacket or by any other suitable means. For example, heat may be applied to the tube or casing by direct flame or electric resistance heaters or hot gases may be injected directly into the drier. Further, the driers may be operated under pressure or vacuum.

In the specific illustration given in Fig. 1, I provide a cylindrical casing 10 which is enclosed by a jacket 11 providing a chamber there-between for steam or other heating medium. Within the tube 10 is supported for rotation a shaft 12 equipped with laterally extending bars 13. Attached to the bars 13 are the spiral ribbons 14. Since a ribbon type conveyor of this character is well known, a detailed description is believed unnecessary. Instead of the conventional ribbon screw, a spiral may be constructed of a series of narrow ribbons or rods placed side by side with a spacing between each ribbon or rod, the whole assembly being formed into a spiral; also, a conventional spiral screw may be slotted or perforated to provide openings for the vapor to move there-through. Any of such spiral conveyors may be employed in the practice of my invention, as will now be described.

Attached to the forward surfaces of the spiral ribbon 14 are forwardly extending mixing bars or flights 15. The flights may be made by bending a rectangular piece of metal to the shape illustrated in Figs. 3 and 4. Preferably, the flights 15 are of the same width and thickness as that of the ribbon of the screw. The inner attachment end of the flight 15 is preferably cut away at 16.

The flights 15 are attached to the spiral ribbons 14 so that each forms with the ribbon at the point of attachment an angle greater than 90° and less than 180°. I prefer to attach the flights by welding but any suitable means such as bolts, etc., may be employed. The desired angle for each flight will depend upon the pitch of the screw and the material to be handled. For example, with a screw having a pitch of 1 and handling soy bean meal, an angle of 133° between the body of the flight and the spiral portion to which it is attached was found to be most satisfactory.

The length of the flight from the bend 17 thereof to its inner end need be only sufficient to enable it to be rigidly attached to the ribbon of the screw. By cutting off the flight along the line 16, there is no portion of the flight projecting beyond the outer periphery of the ribbon.

The length of the flight 15 from the bend 17 to the free end 18 thereof is preferably from ¼ to ¾ of the horizontal distance between consecutive or adjacent turns of the spiral. This length is dependent, in fact, upon the size of the lumps to be handled.

The spacing of the flights may be varied with driers serving different materials, but I prefer to have the spacing in a given drier uniform. Ordinarily, a spacing of 120° has been found to be effective. Since the mixing flights retard the forward movement of the solids, it is necessary to increase the conveyor speed to secure the same capacity as that secured by a similar screw without the flights. For example, with flights at the 120° spacing, approximately twice the speed is necessary. I have found that the mixing flights of this type are very effective in increasing the capacity of the drying system.

While the equipping of the forward surfaces of the ribbon conveyor with forwardly extending mixing bars is effective for use with powdered, granular, or flaked material, considerable difficulty is experienced with handling materials containing lumps. In the handling of materials containing lumps, there is a tendency for the lumps to be dropped behind that part of the spiral in front of which the main mass is being moved forwardly. While only part of the lumps are thus carried back, the result is the building up in the drier of a considerable amount of lumps which, under certain conditions of moisture and temperature, may adhere together and cause a stoppage in the drier.

By forming the flights, as above described, with the body of the flight extending at an angle greater than 90° and less than 180° from the spiral ribbon, I find that adequate mixing of the solids is accomplished with a small amount of breakage while at the same time carrying forward any lumps. With the structure described, the top edge of the flight just clears the inside of the tube 10 while the short end of the flight is secured to the ribbon which is pushing the solids forward, the free end of the flight being extended toward the next turn of the spiral. When the top edge of the flight is approximately equidistant along its length from the inside of the tube, the flat surface of the flight is not parallel to the center of the tube but slants downwardly when the flight is being moved upwardly. This downward slant, as shown best in Figs. 2 and 5, causes any lumps to slide forward, thus preventing them from dropping back over the spiral and allowing them to move ahead with the finer material. The amount of the downward slant is controlled by the angle of the bend in the flight and the pitch of the spiral.

Operation

In the operation of the drier, the solid material is pushed forward as the spiral turns in the same manner as in the conventional screw conveyor until one of the mixing flights moves downwardly into it. The flight moves downwardly and, as it passes the bottom of the tube in an upward direction, the material is pushed ahead of the flight. That portion of the material next to the inside of the tube moves away from the tube surface and a portion of the material which was originally on the outside of the mass drops into a position behind the flight and into contact with the inner side of the tube. As the flight travels upwardly, some of the material is carried part way up the side of the tube, spilling over the edge and end of the flight, and back into the pile at the bottom of the tube. Thus the material is mixed and moved forwardly with very little impact against the tube or mixing flights and consequently, with very little breakage into an undesirably fine product. The mixing thus gives a large surface exposure from which the vaporizing liquid may readily escape. By way of example, in an actual commercial operation in which solvent extracted soy bean meal was being dried, the addition of the mixing flights doubled the capacity of the drying system.

While in the foregoing specification, I have set forth a structure in considerable detail for the purpose of illustrating one embodiment of the invention, it will be understood that such details of structure may be varied widely by those skilled in the art without departing from the spirit of my invention.

I claim:

1. In a drying apparatus, a casing providing interiorly a cylindrical conveyor channel extending in a generally horizontal direction, a rotatably mounted shaft centered about the longitudinal axis of said channel, a single spiral ribbon secured to said shaft and centered with respect thereto, the spiral turns of said ribbon having their outer edges contiguous to and evenly spaced from the cylindrical wall of said channel for advancing comminuted material through said channel and having their inner edges spaced from said shaft to provide an annular opening about said shaft for the circulation of drying gases through said channel, and a plurality of blade-like flights attached at spaced intervals to the front face of the spiral ribbon and extending therefrom into the space between the turns of said ribbon and with their outer edges lying substantially within the cylindrical surface bounding the outer edges of the ribbon turns, each of said flights terminating in a free end at a point spaced from the adjacent turn of said ribbon and behind the point of attachment of the flight with respect to the direction of rotation of said ribbon so that said flights slope downwardly and forwardly during their upward movement and upwardly and forwardly during their downward movement, whereby when said channel is partially filled with said material small portions of the material are successively and continuously lifted by said flights above the material in the bottom of the channel and gently returned thereto by being spilled over the inner edges and free ends of said flights so as to expose a large surface area of said material without undue breakage and retardation of the forward movement of said material.

2. In a drying apparatus, a casing providing interiorly a cylindrical conveyor channel extending in a generally horizontal direction, a rotatably mounted shaft centered about the longitudinal axis of said channel, a single imperforate spiral ribbon secured about said shaft and centered with respect thereto, the spiral turns of said ribbon having their outer edges contiguous to and evenly spaced from the cylindrical wall of said channel for advancing comminuted material through said channel and having their inner edges spaced from said shaft to provide an annular passage through said channel for the circulation of drying gases, and a plurality of blade-like flights attached at evenly spaced intervals to the front face of the spiral ribbon at an obtuse angle thereto and extending therefrom into the space between the turns of said ribbon and with their outer edges lying substantially within the cylindrical surface bounding the outer edges of the ribbon turns, each of said flights terminating in a free end at a point spaced from the adjacent spiral turn by from one-fourth to three-fourths the horizontal distance between said turns and at a point substantially behind the point of attachment of the flight to said ribbon with respect to the direction of rotation of said ribbon so that said flights slope downwardly and forwardly during their upward movement and upwardly and forwardly during their downward movement, whereby when said channel is partially filled with said material small portions of the material are successively and continuously lifted by said flights above the material in the bottom of the channel and gently returned thereto by being spilled over the inner edges and free ends of said flights so as to expose a large surface area of said material without undue breakage and retardation of the forward movement of said material.

LIONEL K. ARNOLD.

REFERENCES CITED

The following references are of record in the file of this patent:

UNITED STATES PATENTS

| Number | Name | Date |
| --- | --- | --- |
| 156,351 | Hulett et al. | Oct. 27, 1874 |
| 934,603 | Gedge | Sept. 21, 1909 |
| 1,521,044 | Parker | Dec. 30, 1924 |
| 1,708,947 | Jaeger | Apr. 16, 1929 |
| 2,064,131 | Tuscan et al. | Dec. 15, 1936 |
| 2,161,631 | McFarland | June 6, 1939 |